United States Patent
Gerum

[11] 3,894,278
[45] July 1, 1975

[54] BATTERY CHECKING CIRCUIT
[75] Inventor: Erich Gerum, Nurnberg, Germany
[73] Assignee: Diehl, Nurnberg, Germany
[22] Filed: Feb. 6, 1974
[21] Appl. No.: 440,266

[30] Foreign Application Priority Data
Feb. 10, 1973 Germany............................ 2306545

[52] U.S. Cl.................. 320/48; 58/23 BA; 340/249
[51] Int. Cl.² ...................... H02J 7/00; H01M 10/38
[58] Field of Search ........ 320/43, 48; 340/248, 249; 58/16, 16.5, 23 BA

[56] References Cited
UNITED STATES PATENTS
3,196,357  7/1965  Hoag............................ 340/249 UX FOREIGN PATENTS OR APPLICATIONS
1,128,165  9/1968  United Kingdom................... 320/48

Primary Examiner—J. D. Miller
Assistant Examiner—Robert J. Hickey
Attorney, Agent, or Firm—Spencer & Kaye

[57] ABSTRACT

A circuit for checking the charge state of a battery of a battery operated device. The circuit includes a signal generator and a control transistor which controls the operation of the signal generator, both of which are connected to the battery terminals. The state of the control transistor is controlled by the state of a comparison circuit, including a switching transistor and a reference voltage member connected to the base thereof, which compares the voltage across the battery terminals with the reference voltage.

18 Claims, 3 Drawing Figures

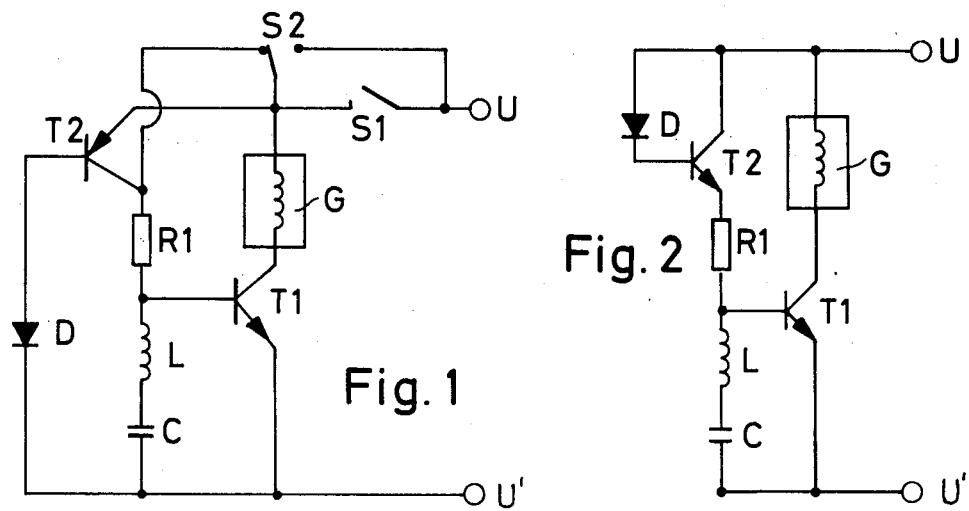
Fig. 1
Fig. 2
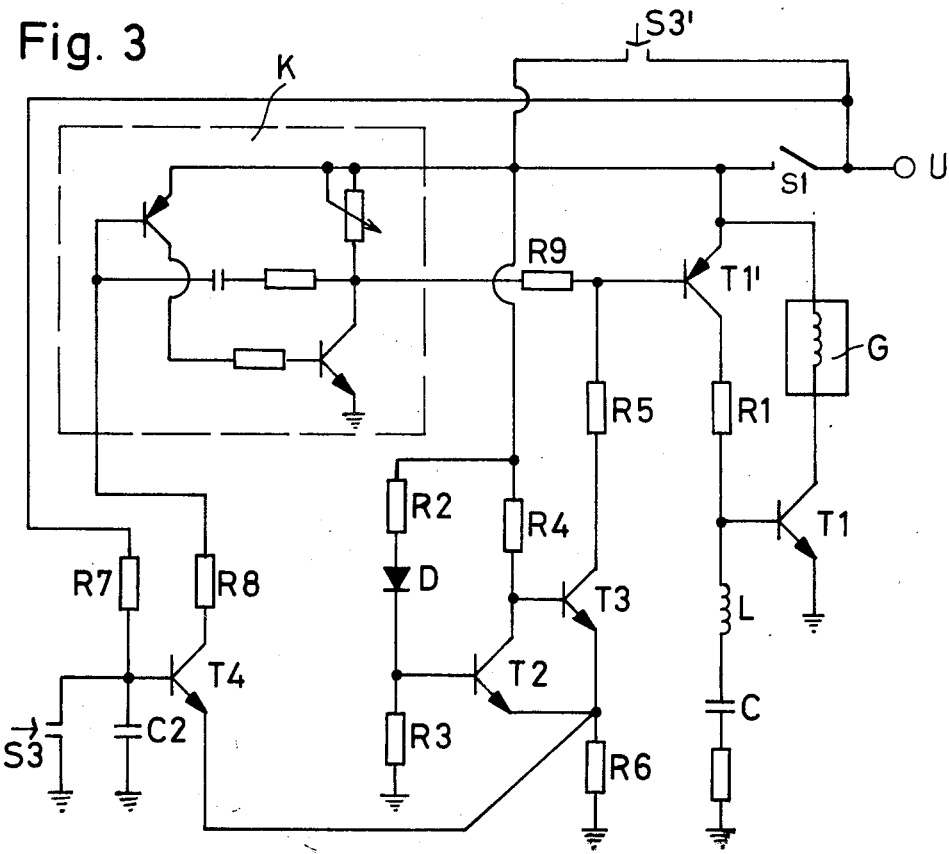
Fig. 3

BATTERY CHECKING CIRCUIT

BACKGROIND OF THE INVENTION

The present invention relates to a circuit for checking the charge state of the battery of a battery operated device, particularly an alarm clock having a signal sound generator operated by a control transistor.

With battery operated devices it is desirable for a user to know whether the charge state of the battery is sufficient for further operation of the device. In particular, such a control possibility is required for alarm clocks since their sudden failure will not always be noted in time.

German Pat. No. 1,204,326 issued Nov. 4th, 1965 describes a monitoring device for the automatic actuation of an indicator signal when a predetermined minimum voltage value is reached in a low voltage source. In the circuit disclosed in that patent, a bridge circuit, which has a Zener diode in one branch thereof, is connected to the battery to be monitored, and the emitter-base path of a transistor is connected across the output of the bridge circuit. The collector of the transistor is connected to a signal generator which is operated via a further voltage source. This circuit has a number of drawbacks. Initially, the voltage of the battery operating the signal generator is not being monitored so that fluctuations at this voltage source cannot be indicated. Furthermore, the bridge circuit constitutes an additional load for the battery to be monitored since current continuously flows through both bridge branches. Additionally, the circuit described in the patent cannot be used for low-voltage batteries, e.g., 1.5 volt.

German Auslegeschrift (Laid-Open Pat. application) No. 1,807,407 describes a battery testing device for an alarm clock with a signal sound generator which operates with a double switch. If the double switch is brought into the switching position intended for battery testing, then the control transistor for the signal sound generator energizes the signal sound generator until the double switch is again switched. This test switching position constitutes a high load on the battery which cannot be handled for long periods of time by a tired battery. Depending on the charge state of the battery, the signal sound generator produces different sounds. From these different sounds the user must therefore draw his own conclusion about the charge state of the battery. This control circuit has the drawback that the user does not obtain clear information whether the battery charge is sufficient or not. The user will always hear a signal sound - except for the case where the battery is completely discharged - which he will have to evaluate from case to case. The user will perform the control process until he has decided, on the basis of the more or less strong signal sound, whether the battery should be exchanged or not. Since different signal sounds of this type are difficult to evaluate, the control will be effected for a correspondingly long time. This leads to unnecessary strain on the battery.

SUMMARY OF THE INVENTION

In order to avoid the above drawbacks, it is the object of the present invention to provide a battery checking circuit of the indicated type which produces an unequivocal indication of the charge state of the battery.

According to the present invention this is accomplished in that in a circuit including a signal generator and a control transistor for the signal generator, both of which are connected to the battery terminals, a comparison circuit, including a switching transistor and a reference voltage member connected to the base of the switching transistor, is provided to control the state of the control transistor. The comparison circuit compares the voltage across the battery terminals with the reference voltage to determine the state of the switching transistor which in turn controls the state of the control transistor.

If in this circuit the battery voltage drops due to battery discharge, so that it falls into the range of the substantially constant voltage drop at the reference voltage member, for example, if the voltage of a 1.5v battery has been discharged to about 95 percent and accordingly is only 1.0 to 1.2V, then the switching transistor blocks. This circuit then converts the blocking of the switching transistor to the desired indication.

According to an advantageous embodiment of the present invention, in order to test the battery the emitter-collector path of the switching transistor is connected ahead of the base of the control transistor by mean of a switch so that the emitter of the switching transistor is connected to one battery terminal and the reference member is connected between the base of the switching transistor and the other battery terminal. If in this embodiment a battery test is made, the switching transistor will be conductive when there is sufficient battery voltage and will control the control transistor so that a signal is produced. If the battery voltage has dropped, then the difference between the battery voltage and the voltage of the reference member is no longer sufficient to switch on the control transistor, and consequently no signal is produced. Thus, if a signal is produced, this means that the battery charge is sufficient for further operations and if no sound is produced, the battery must be exchanged.

According to another embodiment of the present invention a pulse circuit, e.g., an astable multivibrator, and the comparison circuit are connected in parallel ahead of the control transistor to control same. In this circuit the alarm signal, if the battery voltage is sufficient, consists of an intermittent sequence of indicating signals with the frequency timing of the signals being determined by the frequency of the pulse circuit. If the battery voltage has dropped sufficiently for the switching transistor of the comparison circuit to change its state, in this embodiment to block, then the alarm signal changes to a continuous indication.

Preferably this switching of the control transistor to its on state when the switching transistor is in its off or blocked state is accomplished in that the base of an inverter transistor is connected to the collector of the switching transistor, and the emitter-collector path of the inverter transistor is connected to the control electrode of the control transistor. The inverter transistor becomes conductive when the switching transistor blocks and is blocked while the switching transistor is conductive.

BRIEF DESCRIPTION OF THE DRAWINGS

FIG. 1 is a schematic circuit diagram of one embodiment of the present invention for use with an alarm clock having a switch for checking the battery.

FIG. 2 is a schematic circuit diagram of a modification of the embodiment of FIG. 1.

FIG. 3 is a schematic circuit diagram of a further embodiment of the invention for use with an alarm clock.

DESCRIPTION OF THE PREFERRED EMBODIMENTS

Referring now to FIG. 1, there is shown one embodiment of the invention as applied to an alarm clock having a sonic signal generator. As shown in the figure, the collector-emitter path of a control transistor T1 is connected in series with the inductance coil of a sonic signal generator G. Via an alarm switch S1 of the clock, which is closed at the selected time, the sonic signal generator G is connected with the terminal U of a battery. The emitter of the control transistor T1 is connected to the other battery terminal U'. An LC series circuit containing an inductance L and a capacitance C are connected in parallel with the base-emitter path of the control transistor T1. The inductance L is inductively coupled with the inductance of the sonic signal generator G. A resistor R1, which serves to control current limiting, is connected via one position of a switch S2 in parallel with the series connection of the inductance of the generator G and the collector-base path of control transistor T1.

To check the condition of a battery connected to the terminals U, U', a comparison circuit, including a switching transistor T2 and a reference voltage member D, is provided. The switching transistor T2 has its emitter-collector path connected in series with the resistor $R_1$, this series circuit being directly connected in parallel with the inductance of the signal generator G and the collector-base path of the control transistor T1. The base of the switching transistor T2 is connected to the emitter of the control transistor T1, and hence to the terminal U', via the reference voltage member D which, as illustrated, is a diode operated in the forward direction.

In the switching position of switch S2 as shown in FIG. 1 the emitter-collector path of the switching transistor T2 is bridged or short circuited. In the other switching position, the switch S2 bridges the alarm switch S1.

The above-described circuit operates as follows:

If in the position of switch S2 as shown in FIG. 1 the alarm switch S1 closes, then the battery voltage at terminals U, U' will be applied across the series connection of the signal generator G and the emitter-collector path of control transistor T1, and to the base of transistor T1 via the switch S2 and the resistor R1. The application of this voltage, together with the functioning of the LC circuit controls the transistor T1 to cause the generator G to emit a sonic indication.

If the switch S2 is switched to its other position in order to check the charge state of the battery, then the emitter-base path of the switching transistor T2 is connected in series with the reference member D between the voltage terminals U, U' of the battery and the emitter-collector path of the switching transistor T2 is connected between the base of the control transistor T1 and the battery terminal U. A substantially constant voltage drop occurs across the reference voltage member D.

If the battery voltage is still sufficiently higher than the voltage across reference voltage member D, so that the resulting voltage difference is sufficient to activate switching transistor T2, i.e., switch transistor T2 to its conductive state, then the control transistor T1 also becomes conductive and a signal sound is again produced. If, however, the battery voltage has dropped, due to consumption of the battery charge, to a point where the voltage difference between the voltage at the reference voltage member D and battery the voltage can no longer switch the switching transistor T2 to its conductive state, then control transistor T1 will also be retained in its blocked or non-conductive state, and no signal sound is produced.

FIG. 2 shows a modification of the circuit of FIG. 1. In this figure, the switches S1 and S2 are not shown, and the illustrated connections show the simplified circuit with the switch S2 switched to the position for checking the battery, i.e. the right hand position in FIG. 1. In this embodiment, the reference voltage member D and the collector of the switching transistor T2 are connected to the same battery terminal, i.e. the terminal U, and the emitter of transistor T2 is connected with the base of the control transistor T1 via the resistor R1. The operation of this embodiment is the same as that described in connection with FIG. 1.

In the embodiment of the invention shown in FIG. 3, the arrangement of the alarm switch S1, the signal sound generator G, the control transistor T1, the inductance L, the capacitance C and the resistor R1 are the same as in FIG. 1. However, a further control transistor T1' is provided whose emitter-collector path is part of a voltage divider connected ahead of the base of control transistor T1. In particular, the emitter-collector path of transistor T1' is connected, together with the series connected resistor R1, in parallel with the series connection of the signal generator G and the collector-base path of transistor T1. Connected to the base of this further control T1' via a resistor R9 is the output of a pulse circuit K, which is preferably, as illustrated, an astable multivibrator.

In this embodiment, the comparison circuit, including the control transistor T2 and reference voltage member D is connected in parallel with the pulse circuit K at the base of the control transistor T1'. In the comparison circuit, the reference voltage member D is disposed in one branch of a voltage divider R2, R3 which is connected between the battery terminals U and U'. The base-collector path of the switching transistor T2 together with a series connected resistor R4 are connected in parallel with the branch of the voltage divider R2, R3 in which the reference voltage member D is disposed. The base-emitter path of an inverter transistor T3, whose collector is connected with the base of the control transistor T1' via a resistor R5, is connected in parallel with the collector-emitter path of the switching transistor T2. A common drop resistor R6, which can be eliminated if desired, is connected between the emitters of transistors T2 and T3 and one of the battery terminals, i.e. ground as illustrated.

In order to be able to deactivate or block the pulse circuit K at a desired time, an auxiliary circuit is connected to the pulse circuit. The auxiliary circuit includes a transistor T4, a charge capacitor C2, and a charge resistor R7 which is connected between the charge capacitor C2 and the terminal U. The charge capacitor C2 is connected in parallel with a key switch S3 and the base-emitter path of the transistor T4 whose collector is connected with the pulse circuit K via a drop resistor R8 and whose emitter is preferably connected with the emitters of the transistors T2 and T3.

The circuit according to FIG. 3 operates as follows if the battery charge is sufficient:

When the alarm switch S1 is closed, the transistor T4 will become conductive since the capacitor C2 is charged, and the pulse circuit K begins to emit output pulses. These pulses are applied to the base of the control transistor T1', causing it to become conductive in the timing of these pulses. The conduction of transistor T1' in turn causes the control transistor T1 to become conductive and the signal generator emits alarm sounds in the timing of the pulses. The sound level is determined mainly by the natural mechanical frequency of the signal generator. The switching transistor T2 of the comparison circuit becomes conductive, and consequently the inverter transistor T3 is blocked.

For a short-time interruption of the alarm signal, for example, for 4 to 5 minutes, the key switch S3 is actuated, causing charging capacitor C2 to discharge. The previously conductive transistor T4 therefore blocks and interrupts the pulse sequence of the pulse circuit K and consequently, transistor T1' also blocks. No alarm signal will sound until the charging capacitor C2 has been recharged sufficiently for transistor T4 to become conductive again and consequently cause the pulse circuit K to again emit pulses.

If the battery charge is too weak and thus the battery voltage has dropped, the circuit operates as follows once the alarm switch S1 is closed.

The difference between the battery voltage and the voltage drop at the reference voltage member D and at resistor R2 is so small that transistor T2 blocks. The blocking of transistor T2 causes the transistor T3 to become conductive and consequently to activate transistor T1' via resistor R5. This results in the signal generator G producing a continuous sound which indicates a weak charge in the battery.

If it is desired to make a battery check at times when the alarm switch S1 is open, a further key switch S3' is provided by means of which the alarm switch S1 can be bridged. Advantageously the key switch S3' is a portion of the above-described key switch S3 which is designed as a two-terminal key, so that actuation of a single common key simultaneously discharges capacitor C2 via key switch S3 and short-circuits alarm switch S1 via key switch S3'. This has the result that actuation of a common key will not cause the signal sound generator G to be actuated when the battery charge is sufficient since capacitor C2 is discharged and the intermittent sound is not produced. In the case of an insufficient battery charge, the continuous sound is produced as is the case of an insufficient battery charge and a closed alarm contact S1.

In a further modification of the present invention, a switch, for example, a switching transistor, may be provided instead of resistor R6 which switch is closed at the time the alarm is set. With such a switch it is possible to substantially avoid current consumption by transistors T2 and T4 during the time between two alarm times. In a further modification of the invention, the pulse circuit K can be switched off whenever transistor T3 becomes conductive.

The reference voltage member D used for low-voltage batteries (e.g. 1.5 volt) of the type used in alarm clocks may be a diode operated in the forward direction which has a forward voltage of, for example, 0.4 to 0.6 V. For higher voltages, a series connection of such diodes of a Zener diode may be used.

It is to be understood that the circuit according to the present invention can be used in devices other than the above-described alarm clocks, for example, in battery operated calculators, and may include signal generators or indicators other than sound generators.

It will be understood that the above description of the present invention is susceptible to various modifications, changes and adaptations, and the same are intended to be comprehended within the meaning and range of equivalents of the appended claims.

I claim:

1. A circuit for checking the charge state of a battery of a battery operated device comprising in combination:

a pair of terminals connectable to the terminals of a battery;

a signal generator;

first circuit means, including a control transistor, for connecting said signal generator to said terminals and for controlling the operating state of said signal generator;

comparison circuit means, including a switching transistor connected to said control transistor and a reference voltage member connected to the base of said switching transistor, for comparing the voltage across said terminals with the reference voltage of said reference voltage member and for controlling the state of said control transistor in accordance with the voltage difference resulting from the comparison; and switch means for selectively connecting the base of said control transistor to one of said terminals when in a first position, and for connecting the base of said control transistor to said one terminal via the emitter collector path of said switching transistor when in a second position to effect a battery check.

2. A circuit as defined in claim 1 wherein said reference voltage member is a diode operated in the forward direction.

3. A circuit as defined in claim 2 wherein said reference voltage member is connected between the base of said switching transistor and one of said pair of terminals and collector-emitter path of said control transistor is connected in series with said signal generator across said pair of terminals.

4. A circuit for checking the charge state of a battery of a battery operated device comprising in combination:

a pair of terminals connectable to the terminals of a battery;

a signal generator;

first circuit means, including a control transistor, for connecting said signal generator to said terminals and for controlling the operating state of said signal generator; and comparison circuit means, including a switching transistor having its emitter-collector path connected between the base of said control transistor and one of said pair of terminals and a reference voltage member connected between the base of said switching transistor and one of said pair of terminals, for comparing the voltage across said terminals with the reference voltage of said reference voltage member and for controlling the state of said control transistor in accordance with the voltage difference resulting from the comparison.

5. A circuit as defined in claim 4 wherein the emitter of said switching transistor is connected to one of said terminals and said reference voltage member is connected between the base of said switching transistor and the other of said terminals.

6. A circuit as defined in claim 4 wherein the collector of said switching transistor is connected to one of said terminals and said reference voltage member is connected between the base of said switching transistor and said one of said terminals.

7. A circuit as defined in claim 4 wherein the collector-emitter path of said control transistor is connected in series with said signal generator across said pair of terminals.

8. A circuit as defined in claim 7 wherein said signal generator is a sound signal generator; and wherein said first circuit means further includes an LC series circuit connected between the base of said control transistor and the other of said pair of terminals.

9. A circuit as defined in claim 4 wherein said reference voltage member is a diode operated in the forward direction.

10. A circuit for checking the charge state of a battery of a battery operated device comprising in combination:
a pair of terminals connectable to the terminals of a battery;
a signal generator;
first circuit means, including a control transistor, for connecting said signal generator to said terminals and for controlling the operating state of said signal generator;
comparison circuit means, including a switching transistor connected to said control transistor and a reference voltage member connected to the base of said switching transistor, for comparing the voltage across said terminals with the reference voltage of said reference voltage member and for controlling the state of said control transistor in accordance with the voltage difference resulting from the comparison; and
a pulse generator means, whose output is connected to said control transistor, for supplying a sequence of pulses to said control transistor to cause said first circuit means to energize said signal generator means in the timing of said pulses whereby said signal generator produces intermittent signals, said comparison circuit means being connected to said control transistor in parallel with said pulse generator means so that upon actuation of said switching transistor said control transistor is rendered continuously conductive to cause said signal generator to produce a continuous indication.

11. A circuit as defined in claim 10 wherein said reference voltage member is a diode operated in the forward direction.

12. A circuit as defined in claim 10 wherein: the output of said pulse generator means and the output of said comparison circuit means are connected to the base of said control transistor; said first circuit means includes a further control transistor having its emitter-collector path connected in series with said signal generator acros said pair of terminals; and the emitter-collector path of said control transistor is connected between the base of said further control transistor and the one of said pair of terminals to which said signal generator is directly connected.

13. A circuit as defined in claim 12 wherein said signal generator is a sound signal generator; and wherein said first circuit means further includes an LC series circuit connected between the base of said further control transistor and the other of said pair of terminals.

14. A circuit as defined in claim 10 wherein the emitter-collector path of said switching transistor is connected across said pair of terminals, and said reference voltage member is connected in series with the base-emitter path of said switching transistor across said pair of terminals.

15. A circuit as defined in claim 14 wherein said comparison circuit means further includes an inverting transistor for inverting the output signal from said switching transistor, said inverting transistor having its base connected to the collector of said switching transistor and its emitter-collector path connected between said control transistor and one of said pair of terminals.

16. A circuit as defined in claim 11 wherein said reference voltage means is connected in one branch of a voltage divider connected across said pair of terminals.

17. A circuit as defined in claim 10 further including: a first normally open switch means connected in series with one of said pair of terminals for supplying power to said circuit when in closed position; and a second normally open switch means for short circuiting said first switch means to effect a battery check.

18. A circuit as defined in claim 17 further comprising charge circuit means, including a third normally open switch means, for selectively blocking the operation of said pulse generator means, said second and third switch means being coupled together.

* * * * *

UNITED STATES PATENT OFFICE
CERTIFICATE OF CORRECTION

Patent No. 3,894,278            Dated July 8, 1975

Inventor(s) Erich Gerum

It is certified that error appears in the above-identified patent and that said Letters Patent are hereby corrected as shown below:

On the cover sheet item [45] "July 1, 1975" should read -- July 8, 1975 --.

Signed and Sealed this fourth Day of November 1975

[SEAL]

Attest:

RUTH C. MASON
*Attesting Officer*

C. MARSHALL DANN
*Commissioner of Patents and Trademarks*